May 12, 1970     F. P. SLOAN     3,510,884
SIPHON VALVE
Filed March 11, 1969     4 Sheets-Sheet 1
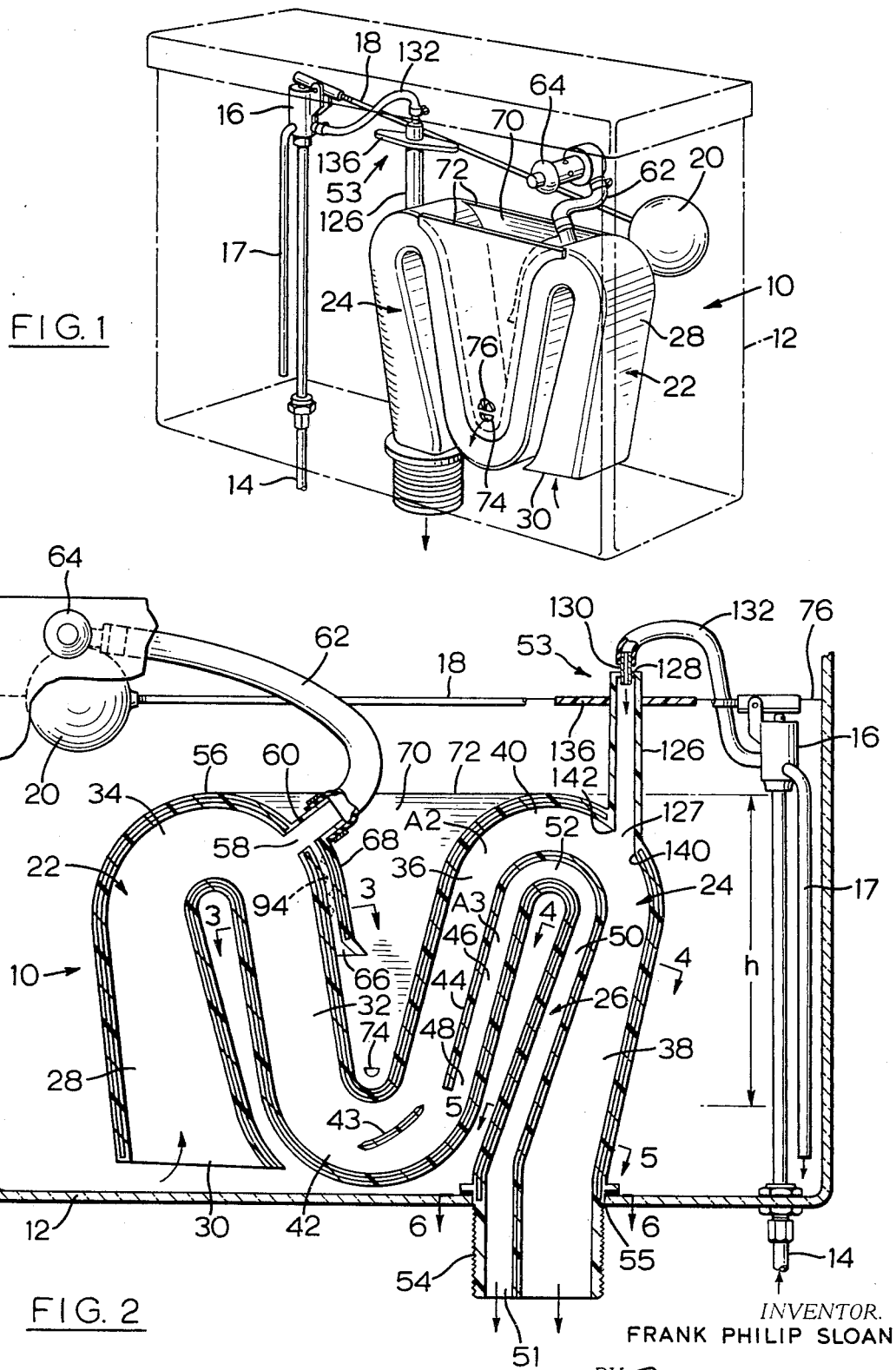
INVENTOR.
FRANK PHILIP SLOAN
BY Rogers, Bereskin, & Parr May 12, 1970     F. P. SLOAN     3,510,884
SIPHON VALVE Filed March 11, 1969     4 Sheets-Sheet 3

*INVENTOR.*
FRANK PHILIP SLOAN
BY *Rogers, Bereskin, & Parr*

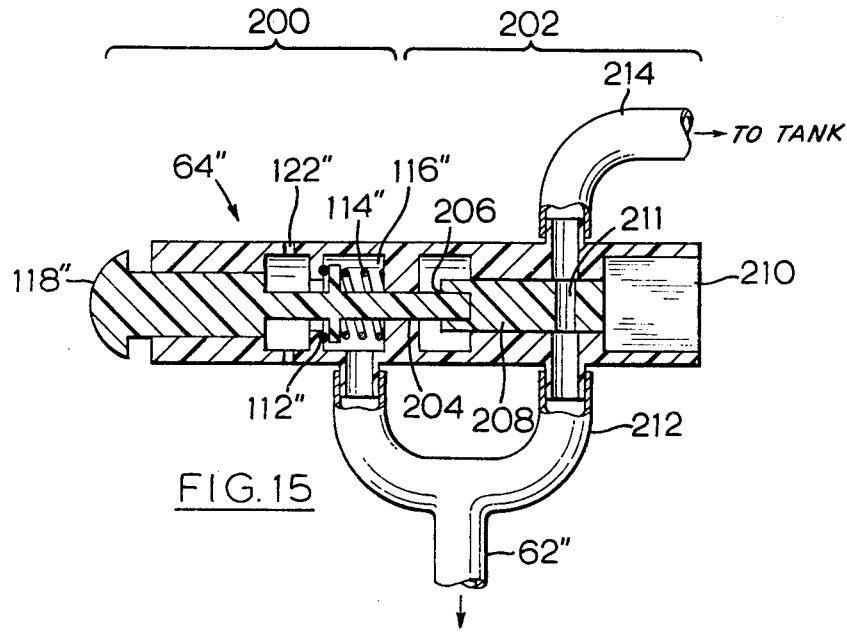
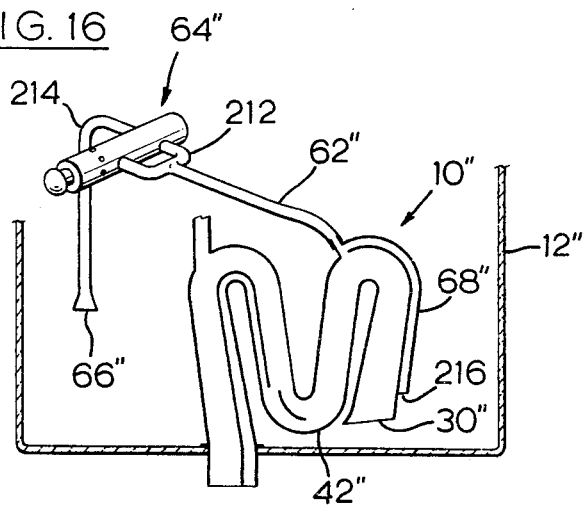
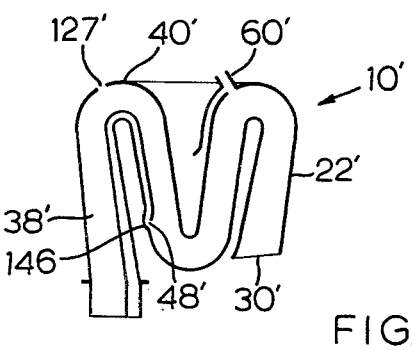

United States Patent Office 3,510,884
Patented May 12, 1970

3,510,884
SIPHON VALVE
Frank Philip Sloan, 19 Lascelles Blvd.,
Toronto 7, Ontario, Canada
Continuation-in-part of application Ser. No. 704,593,
Feb. 12, 1968, which is a continuation-in-part of
application Ser. No. 499,715, Oct. 21, 1965. This
application Mar. 11, 1969, Ser. No. 806,074
Int. Cl. E03d 1/08
U.S. Cl. 4—42                                          4 Claims

ABSTRACT OF THE DISCLOSURE

A siphon valve, primary for toilet tanks, having primary and secondary siphons joined at a central bend to form an M-shaped structure. A tertiary siphon inside the secondary siphon extends from just above the intermediate bend to the secondary siphon outlet. Water enters the primary siphon and discharges through the secondary and tertiary siphons, flow commencing upon release of air through an air opening in the top of the primary siphon. A flow deflector in the central bend diverts extra water to the secondary siphon, and the outlet leg of the secondary siphon contains an elongated venturi to increase flow velocity therein, to expel air bubbles in the secondary siphon.

---

This application is a continuation-in-part of my co-pending application No. 704,593 filed Feb. 12, 1968, itself a continuation-in-part of my application No. 499,715 filed Oct. 21, 1965, now abandoned.

This invention relates to a siphon valve for a liquid reservoir. It particularly relates to a self-correcting siphon valve suitable as a flush device for a toilet tank or the like.

Various attempts have been made in the past to provide siphon valves in which the siphon flow is interrupted in one way or another by an air bubble. These devices have generally been unsuccessful, because they have had to cope with widely varying operating conditions and they have generally been unable to meet such conditions. A particularly common problem in prior art devices is that once a malfunction or abnormal event occurs, they have been unable to correct themselves to restore normal operation.

The siphon valve shown in my above referred to application has no moving parts except for an air release button and will under most circumstances restore itself to normal operation in the event of incorrect operation. However, it is found that for very low heads of water, air is sometimes trapped in the outlet of the siphon valve and interferes with operation.

Therefore, the present invention provides improved means for eliminating air blockages in the siphon valve. The improved means comprises a venturi in the outlet leg of the siphon valve, to increase liquid velocity and thus to remove air blockage. The improved air block removal means may also include a flow deflector in the siphon valve as will be described, to increase the flow of water at the location where air may tend to accumulate.

Figure 3:
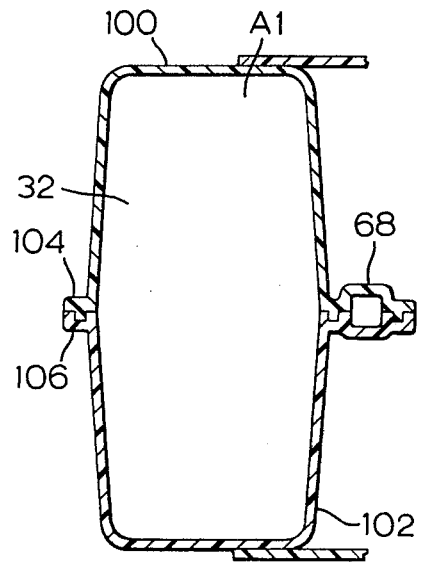
Figure 4:
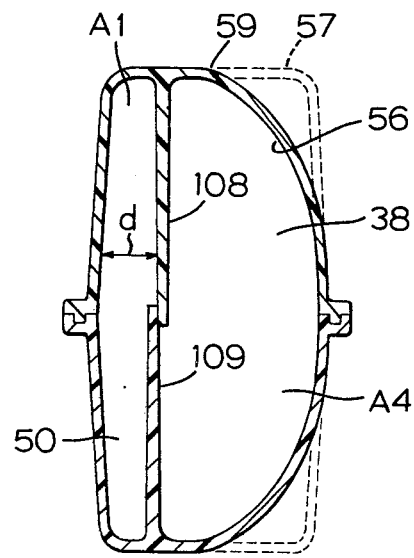
Figure 5:
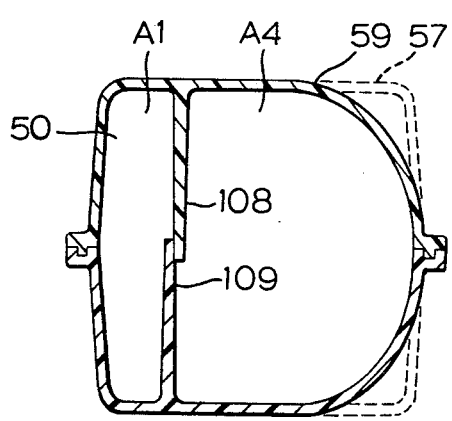
Figure 6:
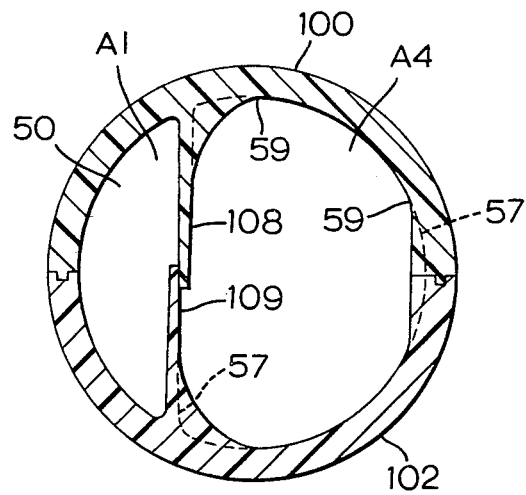
Figure 6A:
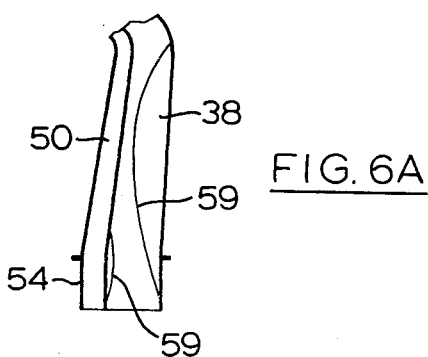

Further objects and advantages of the invention will appear from the following description, taken with the accompanying drawings, in which:

FIG. 1 is a perspective of a typical embodiment of the invention, indicated as located in a toilet tank;
FIG. 2 is a vertical section through the centre of the device of FIG. 1, also indicated as located in a toilet tank;
FIG. 3 is a section on the line 3—3 of FIG. 2;
FIG. 4 is a section on the line 4—4 of FIG. 2;
FIG. 5 is a section on the line 5—5 of FIG. 2;
FIG. 6 is a section on the line 6—6 of FIG. 2;
FIG. 6A is a diagrammatic view of the outlet leg of the secondary siphon of the device of FIGS. 1 and 2, showing a venturi therein;
FIGS. 7 to 12 illustrate different stages of operation of the device of FIG. 1;
FIG. 13 is an enlarged view of an actuating control or push button, partly cut away, for use with the device of FIG. 1;
FIG. 14 is a diagrammatic vertical section showing a modification of a portion of the device of FIG. 1;
FIG. 15 shows a modified push button for use with a further modification of the invention; and
FIG. 16 is a diagrammatic vertical section showing a siphon valve in a toilet tank with the push button of FIG. 15.

Reference is first made to FIG. 1, which shows a typical self-correcting siphon valve 10 according to the present invention. The valve 10 is shown installed in a toilet tank indicated in chain lines at 12, the toilet tank being provided with a conventional water inlet pipe 14, inlet float valve 16, tank refill conduit 17 (to refill the tank after a flush), float arm 18, and float 20 to turn the inlet valve on and off as the float falls and rises respectively. A bowl refill conduit 132 extends from inlet valve 16 to refill the toilet bowl (not shown), as will be described.

The siphon valve 10 is shaped generally in the form of the letter M and includes three siphons (FIG. 2), namely a primary siphon 22, a secondary siphon 24, and a tertiary siphon 26 having a common wall with the secondary siphon 24. The primary siphon includes an inlet leg 28 having an inlet 30 in its lower end, an outlet leg 32 spaced from the inlet leg 28, and an upper bend 34 connecting the inlet and outlet legs.

The secondary siphon 24 is generally similar in form to the primary siphon, having an inlet leg 36, an outlet leg 38 spaced slightly from the inlet leg 36, and an upper bend 40 connecting its inlet and outlet legs. The outlet leg 32 of the primary siphon is connected to the inlet leg 36 of the secondary siphon by an intermediate bend 42. The bend 42 contains a flow deflector 43, which serves a function to be explained presently.

The tertiary siphon 26 is defined by a member 44 spaced from and extending across and along the inner wall of the secondary siphon. As may be seen, the tertiary siphon includes an inlet leg 46 having an inlet 48 located just above the top of the intermediate bend 42, an outlet leg 50 having an outlet 51 level with the outlet of the secondary siphon, and an upper bend 52 joining its inlet and outlet legs.

At the upper bend of the secondary siphon, there is located an anti-siphon bowl refill tube and water level indicator assembly generally indicated at 53. The structure and function of this assembly will be described in detail presently.

The cross-sectional shapes of the primary siphon, and of the inlet legs of the secondary and tertiary siphons, are generally rectangular, as indicated in FIGS. 1 and 3. The outlet legs 38, 50 of the secondary and tertiary siphons are rounded at their bottoms 54, so that they will fit into the standard round hole 55 usually provided in the bottom of conventional toilet tanks.

The cross-sectional area of the inlet leg 28 of the primary siphon diminishes from the inlet 30 to a point 56 half way around the upper bend 34. The remainder of upper bend 34, and outlet leg 32 of the primary siphon, have a substantially constant cross-sectional area indicated at A1 in FIG. 3.

The cross-sectional areas of the inlet legs 36, 46 of the secondary and tertiary siphons are indicated at A2 and A3 respectively, FIG. 2. The cross-sectional area A3 of the tertiary siphon inlet is about one-quarter to one-third that of area A2 of the inlet leg 36 of the secondary siphon. Areas A2 and A3 together equal area A1.

The cross-sectional area of the tertiary siphon remains the same (i.e. area A3) throughout its length, as indicated in FIGS. 4 to 6. However, the cross-sectional area of the secondary siphon outlet leg 38 diminishes just below upper bend 40 to form an elongated venturi 56 (FIGS. 4 to 6A). The venturi 56 is formed by rounding the corners of the secondary siphon outlet leg 38 to provide a reduced area indicated e.g. by area A4 in FIGS. 4 and 5. The dotted lines 57 in FIGS. 4, 5 and 6 indicate the outline that the secondary siphon outlet leg 38 would have if its area remained constant as area A2, i.e. if the venturi 56 were not formed. The lines 59 in FIG. 6A (and also in FIGS. 4 to 6) indicate the border where the rounding begins, to form the venturi. The venturi begins just below the upper bend 40 and extends, gradually tapering, almost to the bottom 54.

In order to flush the unit, a primary air opening 58 is provided in the upper bend of the primary siphon, inlet 58 being defined by a fitting 60 typically molded with the flush device 10. From the fitting 60, an air conduit 62 (FIG. 1) leads to an air release push-button 64.

In addition, a secondary air opening or inlet 66 is provided, inlet 66 being defined by an enlarged opening in the bottom of a conduit 68 connected to the fitting 60, so that the primary and secondary air openings 58 and 66 are connected.

Finally, the flush device 10 includes a secondary reservoir 70 located in the space between the primary siphon outlet leg 32 and the secondary siphon inlet leg 36. The reservoir 70 is termed a "secondary" reservoir to distinguish it from the primary or main reservoir defined by the toilet tank 12. The bottom of the secondary reservoir is closed by the top surface of the intermediate bend 42 and its sides are closed by a pair of cover plates 72 extending between the primary and secondary siphons. As may be seen from FIG. 2, the secondary air inlet 66 is located approximately half way up the height of the secondary reservoir 70, i.e. it is located at a height about $h/2$ above the top of the intermediate bend 42, where $h$ is the height from the top of the intermediate bend to about the top of the upper bends 34, 40.

Each of the cover plates 72 of the secondary reservoir contains a relatively small drain aperture 74 therein, to permit water to drain from or enter the secondary reservoir at a timed rate. One of the apertures 74 may be closed in whole or in part by a rotatable shield 75, so that the flow or drain rate from the secondary reservoir may be adjusted.

The operation of the device as so far described is as follows, reference being made to FIGS. 7 to 12, which illustrate operation diagrammatically.

Assume that the device is located in the tank 12, and the water level 76 in the tank has reached height H (this being determined by the float valve 16). Assume that the float is set so that the head of water over the device is slightly less than $h/2$, where $h$ is the height from the top of the intermediate bend 42 to the top of the upper bends 34, 40. Assume further that the device has just completed a flush and refill cycle and has now reached equilibrium. The situation is then as follows (see FIG. 7).

Water 78 is present in the inlet leg 28 of the primary siphon, up to a level just at the dam height of the upper bend 34. Compressed air 80 is located in the upper bend 34 and in the outlet leg 32 of the primary siphon, down to the intermediate bend 42. A water trap 82 is present in the intermediate bend and this water extends up the inlet leg 36 of the secondary siphon and up the inlet leg 46 of the tertiary siphon, to a position slightly below the upper bend 52 of the tertiary siphon. Air at atmospheric pressure is present in the remainder of the tertiary and secondary siphons.

FLUSHING

When a user wishes to flush the toilet, he pushes the air release button 64, permitting release of the compressed air 80. (The button 64 should typically be held for at least one-half to one second to release enough air to start a flush and may be held for up to about four seconds without interferring with the flush.) The water head above the device forces water in the tank 12 into the primary siphon inlet 30, rapidly forcing out the air 80 and flushing begins. As water travels through the primary, secondary and tertiary siphons, the water level in the tank 12 rapidly drops.

Figure 8:
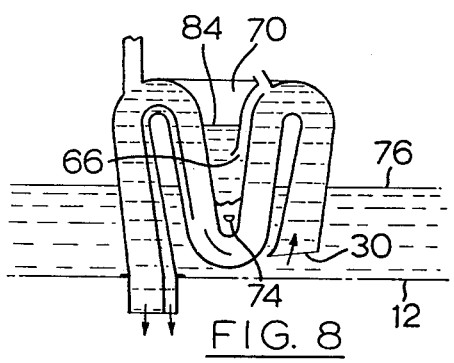

As the water level 76 in the tank 12 drops, the water level 84 in the secondary reservoir 70 also drops, but it lags behind the water level in the tank (FIG. 8). This lagging is caused by the relatively slow draining of the secondary reservoir through drain aperture 74. The secondary reservoir is also drained slightly by suction draining through the secondary air inlet 66 into the primary siphon, after the tank water level 76 has dropped well below the bottom of the upper bend 34.

Figure 9:
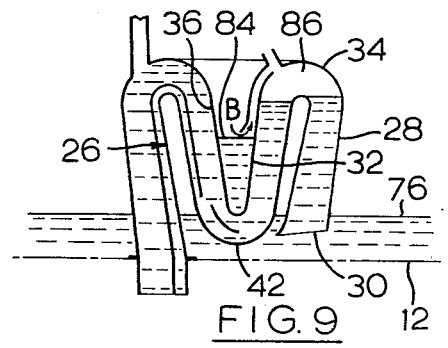

As shown in FIG. 9, when the level 76 in the tank has dropped nearly to the level of the inlet 30, the water level 84 in the secondary reservoir drops below the secondary air inlet 66, exposing this inlet to atmospheric air. Since the tank water level 76 is below the upper bend 34, the pressure in the upper bend 34 is below atmospheric pressure. Air is therefore sucked into the secondary air inlet, once it is exposed (as indicated by arrow B), and a bubble of air 86 forms to interrupt the water flow and break the siphon.

It is found that breaking the siphon in this manner eliminates the extreme turbulance (and also noise) that would be created if the primary siphon inlet 30 were simply allowed to suck air to break the siphon.

Figure 10:
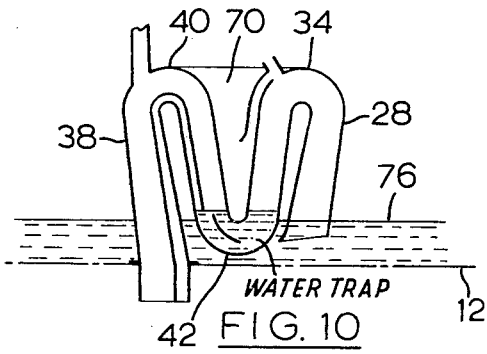

With secondary air inlet 66 open to the air, the water level in the inlet leg 28 of the primary siphon falls back to the water level 76 in the tank. The tertiary siphon 26, which is still primed, continues to draw water out of the outlet leg 32 of the primary siphon, the intermediate bend 42, and the inlet leg 36 of the secondary siphon, until the water level in the intermediate bend 42 drops to the level of the inlet of the tertiary siphon. This action of the tertiary siphon takes only one or two seconds. The situation is now as shown in FIG. 10.

TANK REFILL

During the flush, the water inlet valve 16 continues to deliver water into the tank 12, but of course at a much slower rate than the rate at which water is being evacuated. Once the flush terminates, however, the water level in the tank begins to rise.

As the level in the tank rises and passes above drain aperture 74, water begins to enter secondary reservoir 70. The water level in the secondary reservoir may lag slightly behind that in the tank 12, but any such lagging is far less pronounced than during the flush (since the rate of water inflow during tank filling is less than the rate of water outflow during a flush).

Figure 11:
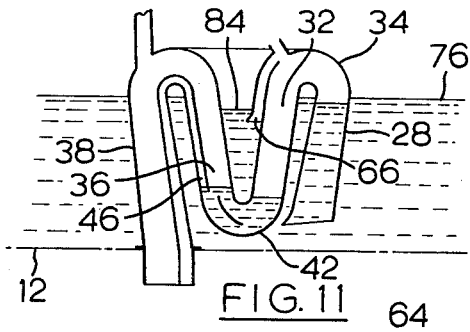

As shown in FIG. 11, as the level 76 in the tank approaches the bottom of the upper bend 34, the water level 84 in the secondary reservoir passes above the secondary air inlet 66 to close it off. The air trapped in the primary siphon then begins to compress as the water rises in the tank. As the water continues to rise in inlet leg 28, the air compressed between the water trap in the intermediate bend 42 and the water in inlet leg 28 drives the level in outlet leg 32 downwardly to the top of intermediate bend 42.

As the water in the inlet leg 28 rises further, it spills over the upper bend 34 and drops to the intermediate bend 42. Because of the compressed air in outlet leg 32, water cannot rise in this leg. Therefore, the water spilling over the upper bend 34 acts to increase the level in the inlet legs 36, 46 of the secondary and tertiary siphons, i.e. the water level in these legs rises. Eventually, the level in the tank reaches a height at which the float shuts off the water inlet valve, at which time the situation is restored to that shown in FIG. 7.

FLOAT OR INLET VALVE MALFUNCTION

If the float sticks and fails to rise to shut off the inlet valve, then the water level in the tank 12 continues to rise. This causes the water level in the inlet legs 36, 46 of the tertiary and secondary siphons to rise, and the tertiary siphon becomes primed and begins to draw water. The tertiary siphon thus performs the function of an overflow pipe.

As previously mentioned, the tertiary siphon 26 has a cross-sectional area about one-quarter to one-third that of the secondary siphon 24. This is about the same size as the overflow pipe of a conventional North American toilet (a conventional overflow pipe is about one-quarter of the outlet area in such conventional toilets). This size is sufficient to handle a greater flow than that into the tank 12 through the inlet valve 16.

The tertiary siphon therefore drains the tank 12 at a rate faster than that at which the tank is being filled, and the water level in the tank falls. The level in the tank is closely followed by the level in the secondary reservoir 70, because the draining of the tank by the tertiary siphon is relatively slow (as compared with a flush). The primary siphon performs a siphoning action at this time (although it has a large bubble of air therein), sucking water into the inlet 30 to replace water removed by the tertiary siphon 26.

When the water levels in the tank and secondary reservoir fall below the secondary air inlet 66, the secondary air inlet is exposed to atmospheric air, breaking the primary siphon. The tertiary siphon continues to draw water from the intermediate bend 42 to leave a water trap therein, and the tank 12 begins to refill, until the tank level again becomes high enough to prime the tertiary siphon. The resultant cycling of about half the contents of the tank is a distinctive condition indicative of a faulty float valve and is easily detectable. In addition, the rise and fall of water in the tank will sometimes unstick the float valve.

INITIAL INSERTION OF THE DEVICE

When the flush device 10 is initially inserted in the tank 12 and the water is turned on, there will be no water trap in the intermediate bend 42. Therefore, when the water in the secondary reservoir 70 rises to a level at which it closes off the secondary air inlet 66, the air in the outlet leg 32 of the primary siphon will not compress until enough water has spilled over the upper bend 34 to establish a water trap in the intermediate bend.

Figure 12:
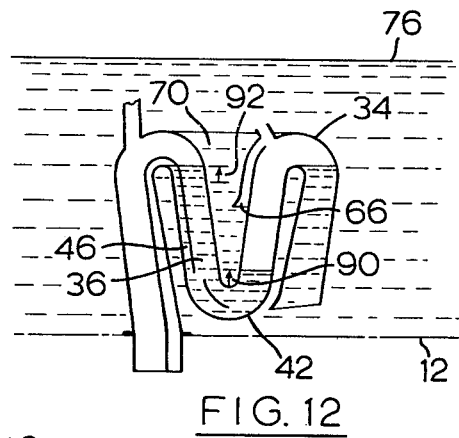
Figure 13:
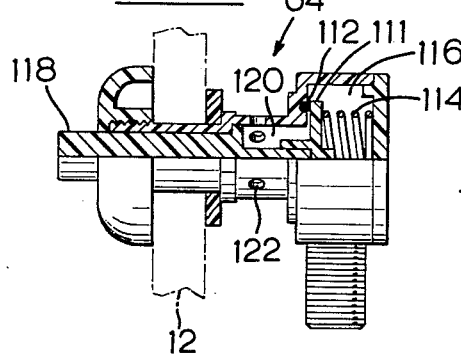

As water spills into the intermediate bend 42, the intermediate bend fills to its top and, due to turbulence, usually fills to the top of the arrow 90 (FIG. 12). With the water trap now established, air compresses in the outlet leg 32 of the primary siphon (due to the head 76 in the tank), but there is no surplus compressed air to drive the water level in the bottom of the outlet leg 32 down to the top of the intermediate bend 42.

The extra height of water 90 in the outlet leg 32 of the primary siphon causes a corresponding increase in height 92 in the levels in the inlet legs 36, 46 of the secondary and tertiary siphons. This usually will prime the tertiary siphon, causing it to draw and lower the level in the tank to a level at which the secondary air inlet is exposed to break the primary siphon. The tertiary siphon 26 then siphons the correct amount of water from the intermediate bend 42 and the tank refills as previously described.

Thus, when the unit is initially installed and the water turned on, an initial correcting action may occur.

CORRECTING ACTION

Occasion for correcting action by the device occurs, as mentioned, when the float valve malfunctions, and may also occur, as mentioned, when the device is initially installed. A similar need for correcting action arises if the air push button 64 is pushed briefly (e.g. for less than one-half second) to release some air in the upper bend 34 of the primary siphon but not long enough to start a flush. When only some of the air from the upper bend 34 is released and replaced by water, the water level in the outlet leg 32 of the primary siphon rises, and the water in the inlet legs 36, 46 of the tertiary and secondary siphons also rises and spills over the tertiary siphon upper bend 52. The tertiary siphon then becomes primed, draws water, and lowers the tank level until the secondary air inlet 66 is exposed, following which the tank refills as previously described.

The need for correcting action also occurs if the air inlet button 64 is pushed briefly while the tank is refilling and air is being compressed in the upper bend 34 and outlet leg 32 of the primary siphon. If some of this air is allowed to escape, then the water level in the outlet leg 32 of the primary siphon rises, causing the water level in the inlet leg 46 of the tertiary siphon to rise too high and spill over the upper bend 52. The tertiary siphon 26 then draws to lower the tank level, and correcting action continues as previously described.

STOPPING A FLUSH

If desired, the flushing action can be interrupted in mid flush, if for example an obstruction should occur in the toilet bowl. The interruption is achieved by actuating the air button 64 to permit air to enter the primary siphon, destroying the siphoning action. It may be noted that flow through the primary siphon will only be interrupted in this manner after the water level in the tank has dropped below the bottom of the upper bend 34. When the tank water level is above this height, the net head of water continues to push water through the siphons whether or not the primary air inlet 58 is exposed to the atmosphere.

From the foregoing explanation, it will be apparent that the tertiary siphon 26 performs several functions. Firstly, it acts as an overflow pipe in case the tank water level becomes too high, thus eliminating the need for a conventional overflow pipe. For this reason, the tertiary siphon is sized, as discussed, so that it will remove water faster than water can be delivered into the tank 12 by the inlet valve 16. For standard North American toilets, this size is about one-quarter of the cross-sectional area of the secondary siphon, but this particular size relation can vary depending on the inlet valve and water pressure applied thereto, and on the size of the secondary siphon (which can vary, depending on the dumping rate desired).

Secondly, the tertiary siphon, by virtue of its size, acts to lower the water level in the tank 12 during correcting action (rather than merely preventing the tank from overflowing). This action brings the tank water level down to a height at which the secondary air inlet 66 is exposed, thus terminating the tank emptying and permitting the tank to refill (after which all flow ceases until the push button is actuated, unless the float valve is malfunctioning).

Thirdly, the tertiary siphon acts to siphon water from the intermediate bend 42 after the primary siphon has been "broken" (by exposure of secondary air inlet 66). The tertiary siphon removes enough water to leave only a water trap at the bottom of the intermediate bend 42. As discussed, if all the water in the intermediate bend were siphoned out after each flush, then less air would be compressed in the outlet leg 32 of the primary siphon during tank refilling, and the water levels would approach those shown in FIG. 12, resulting in constant cycling or running. The cycling could be eliminated by reducing the water head above the device, but in most applications it is desirable to have a higher head of water above the device, to obtain a better flush.

Figure 7:
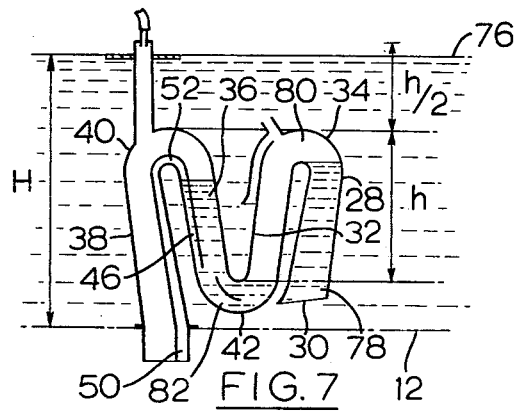

The extent to which the tertiary siphon drains the intermediate bend 42 after a flush is variable. Sometimes the tertiary siphon leaves even more water in the intermediate bend 42 than shown in FIG. 10 (by reason of air entering the tertiary siphon inlet, due to turbulence, and breaking the tertiary siphon), and sometimes it leaves less (because of water momentum tending to empty the intermediate bend). However, it is desirable to have the water level in the primary siphon outlet leg 32 driven right down to the top of the intermediate bend 42 (as shown in FIG. 7) after the tank has refilled, so that the tank can be refilled to the recommended level without the tertiary siphon overflowing.

For this reason, the secondary air inlet 66 and the timing means constituted by reservoir 70 and aperture 74, are arranged so that air compression normally starts before the inlet leg 28 is full (as explained in connection with FIG. 11). The compressed air then drives the primary siphon outlet leg water level down to the correct level. The arrangement is such that usually there is more air compressed than is required for this task. The surplus air simply bubbles around the intermediate bend and provides an audible indication that the device is functioning properly.

As discussed, the cross-sectional area of the inlet leg 28 of the primary siphon decreases from its inlet 30 to a point midway around the upper bend. This produces a smoother water flow into the device, and also, it serves to compress more air in the upper bend 34 and outlet leg 32 of the primary siphon once air compression starts (i.e. when the secondary air inlet is covered with water). The additional trapped air helps drive the water level in the primary siphon outlet leg 32 down to the level of the top of the intermediate bend 42.

The location of the primary air inlet 58, at an angle of about 45 degrees downstream of the midpoint of the upper bend 34, is important, since this is the best location for expelling all or most of the compressed air trapped in the primary siphon, once flushing is initiated. The exact optimum position of primary air inlet 58 will depend to some extent on the velocity of flushing.

The secondary air inlet 66 serves several functions. Firstly, it breaks the primary siphon before the tank water level drops to the inlet 30, thus preventing the noise and turbulence that would occur if the siphoning action were broken by sucking air at the inlet 30. This function could of course be achieved equally well by having the secondary air inlet outside the secondary reservoir 70, just above the inlet 30.

Secondly, the secondary air inlet, once exposed, feeds air into the device to allow the tertiary siphon 26 to extract all but the required amount of water from the intermediate bend 42. Again, the secondary air inlet could be located in the tank 12 just above the inlet 30 and it would still perform this function.

Further, the secondary air inlet 66, together with the secondary reservoir 70, enables the self correcting action of the unit. It is found that if the secondary air inlet is located just above the primary siphon inlet 30, then the tank water level will have to fall to a low level during a correcting action before exposing the secondary air inlet and initiating tank refilling. When the tank water level is this low, it is found that the tertiary siphon 26 will not function, because atmospheric air travels up the outlet leg 38 of the secondary siphon, down the inlet leg 36 of the secondary siphon, and into the inlet 48 of the tertiary siphon to break its siphoning action. This does not occur after a flush when the tertiary siphon is draining the water from the intermediate bend 42 except that needed to supply a water trap, apparently because this adjusting action takes only a brief interval after the flush is completed and the secondary siphon outlet is exposed to atmosphere. However, air entry into the tertiary siphon inlet 48 does occur during correcting action by the tertiary siphon without a flush, if the tank water level is too low.

Such a failure of the tertiary siphon to act results in too much water being left in the intermediate bend 42 when the tank 12 begins to refill. Therefore, when the tank fills up again, the water in the tertiary siphon 26 will spill over the upper bend 52, and continual running or cycling will occur. This is a condition commonly found in prior art siphon flushing devices; they are unable to correct themselves.

The secondary reservoir 70, with its timing drain 74, solves this problem by breaking the primary siphon during a correcting action (i.e. when the tertiary siphon 26 is primarily responsible for tank drain) when the tank water level is still quite high. However, during a flush, when the tank water level drops very rapidly, the secondary air inlet 66 is not exposed until the tank has almost emptied, as described.

As shown in FIG. 2, the secondary air inlet 66 is located at a height $h/2$ above the top of the intermediate bend. This height may vary quite substantially, depending on the proportions of the device. However, if the secondary air inlet is located at too low a level, air will enter the tertiary siphon inlet 48 during correcting action and will prevent the tertiary siphon from operating. Conversely, the secondary air inlet 66 should not be at too high a level, or it will be exposed too soon during a flush unless the drain holes 74 are made very small, and the smaller the drain holes 74 are made, the greater is the likelihood of them clogging.

In order to feed air into the opening 58 fast enough to break the primary siphon quickly and quietly, and to permit the tertiary siphon to operate efficiently, the secondary air inlet 66 and conduit 68 should be of a reasonable size, e.g. equivalent to a ¼ inch diameter tube. However, the inlet 66 and conduit 68 should not be too large, or they will suck water too rapidly from the secondary reservoir 70 during the latter stages of a flush. Such draining would make it difficult to achieve the required time delay in emptying the secondary reservoir, unless the drain apertures 74 in the secondary reservoir are made unduly small.

It may be noted that the secondary air inlet 66 is defined by a flared mouth of conduit 68. The reason for this is that when the water level in the secondary reservoir 70 drops below the secondary air inlet 66, it is important that a clean break be made in the siphoning action of the primary siphon. When the mouth of conduit 68 is not flared, surface tension sometimes causes water to cling to the mouth of the conduit, so that it sometimes sucks an air and water mixture, resulting in an ill-defined break of the primary siphon. This can result in disturbance of the tertiary siphon so that it will not suck enough water from the intermediate bend 42. With an enlarged mouth, there is less tendency for the secondary air inlet to suck water when it becomes exposed to the air. This is because the larger mouth reduces the velocity past the mouth. However, although the enlarged mouth is preferred, a smaller mouth (i.e. a straight continuation of conduit 68) has been used and has given reasonably satisfactory results.

If desired, steps indicated in dotted lines at 94 (FIG. 2) may be formed in conduit 68. The steps 94 reduce the amount of water sucked through this conduit.

The drain apertures 74 in the secondary reservoir 70 must be sufficiently large that water will enter and rise in the secondary reservoir at a reasonably rapid rate during tank refilling. If the water in the secondary reservoir rises too slowly, it will take too long not only to cover secondary air inlet 66, but to cover this inlet to a depth sufficient to prevent air from being blown out inlet 66 as the tank refills. This will result in air compression in the primary siphon starting too late, and there may not be enough air to drive the water level in the primary siphon outlet leg 32 down to the top of the intermediate bend 42.

It will be noted that during a correcting cycle, only half the tank is emptied and then refilled. This wastes less water than if the entire tank were emptied, and correction is faster. A typical correcting cycle, including the time required for tank refill, will usually take about 40 seconds with a typical siphon valve made according to the invention, i.e. it takes about the same time as that needed for a flush and tank refilling.

The location shown for the secondary reservoir is convenient, since this reservoir occupies no excess space (a factor to be considered in small volume toilet tanks). The location shown has the further advantage that the reservoir is shaped generally in the form of a V as viewed from the side, i.e. its cross-section decreases towards its bottom. This has the advantage that as the tank 12 drains, the water in the secondary reservoir falls slowly at first, and then more rapidly as it passes secondary air inlet 66. This ensures a cleaner and more reproducible break of the primary siphon. At the same time, the wide top of the secondary reservoir enables it to hold more water, so that the drain apertures 74 need not be made unduly small.

However, it will be noted that the secondary reservoir could be located elsewhere than between the primary and secondary siphons. For example, it could be formed as a cup, e.g. of polyethylene, of any desired cross-section and could be hung near the push button 64. In this event, the conduit forming a secondary air inlet in the secondary reservoir would lead to the conduit 62, i.e. conduit 62 would in effect be forked, one fork leading to the push button, and the other to the secondary air inlet.

The reason for the flow deflector 43 in the intermediate bend 42, and the venturi 56 in the secondary siphon outlet leg 38, is as follows. It is found that under some conditions without these features, too much water may flow through the tertiary siphon 26 and not enough through the secondary siphon 24. This may result in incomplete expulsion of the air from the upper bend 40 during a flush (usually this air forms a bubble just at the top of the secondary siphon outlet leg 38), and the trapped air reduces the power of the flushing action.

The flow deflector 43 increases the proportion of flow from the primary siphon conducted by the secondary siphon. The venturi 56 increases the velocity of liquid travelling through outlet leg 38 so that this liquid will be more effective in entraining and removing any air trapped near the top of outlet leg 38.

The device shown is particularly suitable for molding from plastic. As shown in FIGS. 3 to 6, it may be cast in two main half portions 100, 102 to provide cementable seam flanges 104, 106 exterior of the flow passages, with cementable overlapping walls 108, 109 which form the member 44 defining the tertiary siphon. After the two main halves are cemented (or otherwise fastened) together, the secondary reservoir side plates 72 may be cemented to the structure.

The M configuration shown for the siphons facilitates air testing of the device to see if there are leaks in the siphons. It is not of course essential that this geometry be preserved, so long as primary and secondary siphons in flow series are provided with a tertiary siphon associated with the secondary siphon, but the geometry shown is preferred. The width W of the unit is selected so that it will fit into a standard size toilet tank.

The rectangular cross-section shown for the upper bends of the secondary and tertiary siphons is advantageous for the following reasons. It is desirable to have the tertiary siphon upper bend 52 as high as possible, so that a higher head of water in the tank 12 can be achieved before the tertiary siphon begins to overflow. Forming the tertiary siphon as a rectangular slit, as shown, decreases its dimension in the direction of arrow $d$ (FIG. 4), so that the height of the bottom of its upper bend 52 can be increased.

Conversely, it is desirable to have the top of the secondary siphon upper bend 40 as low as possible below the water level in the tank, so that the water head will drive the air from upper bend 40 during a flush. This is similarly achieved by stretching the secondary siphon laterally into a rectangle. The lateral extent of the unit is governed by the dimensions of the tank 12 and the practicabilities of molding.

The air push button 64 may be of any desired construction. A typical construction is shown in FIG. 13, in which the member 64 includes a valve member 111 urged against a sealing O-ring 112 by a spring 114. The spring 114 is located in a chamber 116 communicating with air conduit 72. The valve member is pushed by a push rod 118 connected thereto, rod 118 having a relieved portion defining part of a chamber 120. Chamber 120 includes apertures 122 open to the air in its outer wall, so that when push rod 116 is depressed, air may escape from chamber 116 to chamber 120 and through holes 122 to atmosphere.

Reference is next made to the anti-siphon bowl refill tube and water level indicator assembly generally indicated at 53 (FIG. 2). The assembly 53 comprises an upright tube 126 extending upwardly from an opening 127 in the upper surface of the upper bend 40 of the secondary siphon, at a location just downstream of the midpoint of the upper bend. The tube 126 is of fairly substantial internal diameter (e.g. one-half inch) and typically extends several inches above the upper surface of the upper bend 40. The tube 126 terminates in a flat upper surface 128 having a smaller diameter short tube 130 projecting therefrom. A bowl refill conduit 132 extends from the tube 130 to the inlet valve 16. A generally elliptical water level indicator plate 136 is mounted on the tube 126 near the top of the tube, to indicate the optimum water level 76.

The assembly just described operates as follows. After a flush, while the toilet tank 12 is refilling, the toilet bowl (not shown) must be refilled. The refilling is achieved by bowl refill conduit 132, which feeds water into the bowl refill tube 126 so long as the inlet valve 16 is actuated (i.e. so long as the float 20 is below the level needed to shut off the inlet valve). The stream of water falling through the tube 126 enters the outlet leg 38 of the secondary siphon and travels into the toilet bowl. At the same time, inlet valve 16 refills the tank 12 through tank refill conduit 17.

Since the opening 127 is below the water level 76, there will be a tendency for water in the tank to be siphoned into the tank refill conduit 17 and through the conduit 132 and tube 126 into the outlet leg 38 when the tank is filled to level 76. Such a drain into the bowl would cause the float to drop, actuating the inlet valve 16 and causing the toilet to run continually. This problem can be avoided by providing an inlet valve 16 of the type that disconnects tank refill conduit 134 from bowl refill conduit 132 when the inlet valve 16 is shut off, but such a solution requires a more costly inlet valve.

The assembly 53 solves the problem by providing a relatively large diameter tube 126 to a level above the normal water level 76, and a smaller diameter tube thereabove. Because of the difference in diameters between tubes 126, 130, air rises in tube 126 after a flush and kills any siphoning action in bowl refill conduit 132. Water therefore flows from inlet valve 16 through conduit 132 so long as the inlet valve is actuated, but no water will siphon through conduit 132 after the valve is shut off.

The location shown for the inlet tube 126 and aperture 127 serves a further function. During a flush, water from the inlet valve is fed through conduit 132 and tube 126 and joins the water passing through the upper bend 40 of the secondary siphon. The water fed through tube 126 is under considerable pressure and therefore assists the flushing action by assisting in the removal of any air trapped in the upper bend 40 of the secondary siphon. So that the jet of water through tube 126 will asset the flushing action, edge 140 of aperture 127 is rounded, and edge 142 of aperture 127 is sharply angled. This causes water flowing through aperture 127 to tend to hug the downstream side of the upper surface of the upper bend 40, so that it will assist rather than block the flush.

The size of the aperture 127 will depend on the water pressure available at the inlet valve, but it must be large enough so that air will rise through it to prevent siphoning from the bowl refill conduit 132, and yet should be small enough to provide a jet of water when the inlet valve 16 is actuated (to assist a flush). The tube 130 may be extended slightly below top 128 as shown, so that water passing through tube 130 will be less likely to lose its velocity dispersing around the sides of tube 126.

The water level indicator 136 is provided so that persons using or installing the siphon valve device 10 may easily see the best operating level. The elliptical shape of the indicator plate is so that it will not interfere with the rise and fall of the float arm 18.

The indicator 136 is set at the optimum water level for the device and indicates the proper setting for the float 20 and inlet valve 16. This is particularly useful when the device is used to replace the conventional flushing mechanism of a toilet being repaired, in which case the optimum water level for the device may be different than the water level formerly used in the toilet tank.

The distance between the top of indicator 136 and the flat top 128 of tube 126 constitutes a safety margin. Once the water level reaches the top 128, the tertiary siphon 26 begins to overflow (assuming that the device is functioning normally with sufficient air trapped in the primary siphon), and if the water level should somehow reach the top of short tube 130, the device will go into a full flush (because the rate of flow will be fast enough to entrain and remove virtually all air in the upper bends 34, 40).

The top 128 of the refill tube 126 therefore acts as an overflow indicator, so that a user may easily see the level at which the tertiary siphon will overflow. In conventional toilets the overflow level is readily visible in the form of the overflow pipe, but no overflow pipe is needed with the present invention, since the the tertiary siphon conducts normal overflow.

Since the water level can therefore never rise above the top of tube 130, the hole in the tank 12 for the air release push button 64 can safely be located just above this level.

Reference is next made to FIG. 14, which shows diagrammatically a modification of the siphon valve previously described. In FIG. 14 primed reference numerals indicate parts corresponding to those of FIGS. 1 to 13.

In the FIG. 14 valve the inlet 48' of the tertiary siphon is stepped slightly away from the smooth curve of the lower surface of the intermediate bend 42, as shown at 146. The step 146 is into the inner wall of the secondary siphon 24, and performs the same function as flow deflector 43, i.e. it increases the proportion of flow from the primary siphon conducted by the secondary siphon.

In the FIG. 14 valve, the bowl refill tube assembly 53 has been eliminated. Only the opening 127' is shown. Opening 127' may be connected to the bowl refill conduit 132 (provided that inlet valve 16 is of a type that disconnects tank refill tube 134 from bowl refill conduit 132 when valve 16 is shut off), or opening 127' may be plugged and alternative means (such as an existing overflow pipe, when the valve is used to repair a conventional toilet) may be used to refill the bowl.

It will be appreciated that various further changes can be made in the invention as described. For example, the dam heights of the primary and tertiary siphons have been shown as the same, but these could be made different. Further, the tertiary siphon 26 has been shown as having a common wall with the secondary siphon 24, but it could be formed as a separate tube, which in the case of a toilet (and in fact in most cases) would lead to the same location as the outlet of the secondary siphon. However, the relative heights of the tertiary and secondary siphons should be maintained, since the tertiary siphon should siphon before the secondary siphon begins to overflow (otherwise the tertiary siphon may not become primed), and since the secondary siphon should begin to overflow if the tank water level continues to rise after the tertiary siphon is primed.

If desired, a screen or grate may be installed across the primary siphon inlet 30 to straighten the flow of liquid into inlet 30, i.e. to direct the flow upwardly. The screen elements will have a vertical dimension of about one-half inch and may typically consist of slats extending in one direction across the inlet 30 (specifically, in the same direction as the elements 108, 109) so that they may be molded with the siphon valve.

Although two siphons in series have been shown (i.e. the primary and secondary siphons), the principles of the invention can be extended to three siphons in series, with appropriate modifications.

Although the invention has been described in terms of a siphon flushing device for a toilet, the invention may be employed in other appropriate applications where liquid valving is required.

Reference is next made to FIGS. 15 and 16, which show diagrammatically a modification of the invention. In these figures, double primed reference numerals indicate parts corresponding to those of FIGS. 1 to 12.

In the FIGS. 15 and 16 embodiment, the secondary reservoir 70 of FIGS. 1 to 12 has been eliminated. The time delay needed during a flush, so that secondary air inlet 66" will not be allowed to break the primary siphon prematurely, is provided by a time delay mechanism in the push button 64".

The push button 64", shown diagrammatically in section in FIG. 15, has a front portion 200 basically the same as the push button 64 of FIG. 13, so that front portion 200 need not be described further. The push button 64' also has a rear portion 202, which includes an extension 204 of push rod 118" extending slidingly into a depression 206 in a shaft 208. Shaft 208 is operatively coupled to a conventional delay timing mechanism 210 (which may be a mechanical timer, plastic timing strip, etc.) so that when shaft 208 is pushed in (which occurs upon initiation of a flush), it does not return to the position shown in FIG. 15 until about ten seconds have elapsed. Shaft 118", however, returns to the position shown in FIG. 15 as soon as it is released, because of spring 114".

Shaft 208 includes a duct 211 therein communicating between a fork 212 in the conduit 62" and a second conduit 214. The conduit 214 (see FIG. 16) leads into the tank 12 and has an opening in its lower end to define the secondary air inlet 66".

In addition, the fitting 60" includes a duct 68" extending therefrom to just above the inlet 30' to define another air inlet 216.

During a flush, as the water is emptying rapidly from the tank 12", the secondary air inlet 66" is blocked from communicating atmospheric air to the primary siphon by reason of shaft 208, which blocks air passage between conduits 212, 214. The flushing action stops by reason of conduit 68" and opening 216, which breaks the primary siphon. After the flush or at the latter stages of the flush, the shaft 208 returns to its illustrated position and secondary air inlet 66" communicates air to the primary siphon again. Refilling then proceeds essentially as previously described.

During a correcting action, the push button 64" is not pushed. Therefore, the secondary air inlet 66" communicates air to the primary siphon after the tank water level has dropped to about the half way mark. The tertiary siphon then removes the water from the intermediate bend 42" except that needed to form a water trap, and the tank 12" refills as previously described.

What I claim as my invention is:

1. A siphon valve for a primary liquid reservoir, said reservoir typically being of the type provided with an inlet valve for delivering liquid into said reservoir at a predetermined rate, said siphon valve including a primary and a secondary siphon each having an inlet leg and an outlet leg, the outlet leg of the primary siphon being connected to the inlet leg of the secondary siphon for liquid flow therebetween, said siphon valve including
   (a) a primary air opening in said primary siphon and adapted to be coupled to an air release valve, said primary air opening being located in the upper part of said primary siphon in a position such that at least most of the air in said primary siphon is expelled by a predetermined head of water above said primary siphon when said air release valve is actuated,
   (b) a tertiary siphon having an inlet located in the inlet leg of said secondary siphon and having a lower discharge opening, said tertiary siphon having a cross sectional area sufficient to conduct a flow greater than said predetermined flow,
   (c) a secondary air inlet located at a height between the top and the bottom of said primary siphon, said secondary air inlet communicating with said primary siphon,
   (d) a delay device for permitting communication of atmospheric air from said secondary air inlet to said primary siphon at a time normally lagging behind the time when the liquid in said primary reservoir falls to the level of said secondary air inlet,
   (f) and a venturi in the outlet leg of said secondary siphon, to increase the velocity of liquid flow through such outlet leg to assist in removing air from such outlet leg.

2. A siphon valve according to claim 1 wherein said venturi is elongated and extends substantially the entire length of said outlet leg.

3. A siphon valve according to claim 2 wherein the outlet leg of the primary siphon is connected to the inlet leg of the secondary siphon by a central bend, the inlet of said tertiary siphon being located slightly above the bottom of the inlet leg of said secondary siphon to leave a liquid trap in said central bend blocking free air passage between said primary and secondary siphons, and a flow deflector in said central bend for increasing the proportion of liquid from said primary siphon entering said secondary siphon and for reducing the proportion of liquid from said primary siphon entering said tertiary siphon.

4. A siphon valve for a primary liquid reservoir, said reservoir typically being of the type provided with an inlet valve for delivering liquid into said reservoir at a predetermined rate, said siphon valve including a primary and a secondary siphon each having an inlet leg and an outlet leg, and a central bend connecting the outlet leg of the primary siphon to the inlet leg of the secondary siphon for liquid flow therebetween, said siphon valve including
   (a) a primary air opening in said primary siphon and adapted to be coupled to an air release valve, said primary air opening being located in the upper part of said primary siphon in a position such that at least most of the air in said primary siphon is expelled by a predetermined head of water above said primary siphon when said air release valve is actuated,
   (b) a tertiary siphon having an inlet located in the inlet leg of said secondary siphon slightly above the bottom of the inlet leg of said secondary siphon and having a lower discharge opening, said tertiary siphon having a cross-sectional area sufficient to conduct a flow greater than said predetermined flow,
   (c) a secondary air inlet located at a height between the top and the bottom of said primary siphon, said secondary air inlet communicating with said primary siphon,
   (d) a delay device for permitting communication of atmospheric air from said secondary air inlet to said primary siphon at a time normally lagging behind the time when the liquid in said primary reservoir falls to the level of said secondary air inlet,
   (e) and flow deflector means in said central bend for increasing the proportion of liquid from said primary siphon entering said secondary siphon and for reducing the proportion of liquid from said primary siphon entering said tertiary siphon.

References Cited

UNITED STATES PATENTS

| 853,705 | 5/1907 | Lindenberg et al. | 137—128 |
| 1,077,471 | 11/1913 | Herzfield | 137—128 |
| 1,421,531 | 7/1922 | Moras | 137—128 |
| 2,606,326 | 8/1952 | Niccolai | 4—43 |
| 2,921,319 | 1/1960 | Kivela | 4—67 |

FOREIGN PATENTS

| 607,101 | 12/1934 | Germany. |
| 581,222 | 8/1958 | Italy. |

LAVERNE D. GEIGER, Primary Examiner

H. K. ARTIS, Assistant Examiner

U.S. Cl. X.R.

137—124, 142